May 11, 1926.
W. M. BRADSHAW ET AL
1,584,602
REGULATOR SYSTEM
Filed Dec. 7, 1921
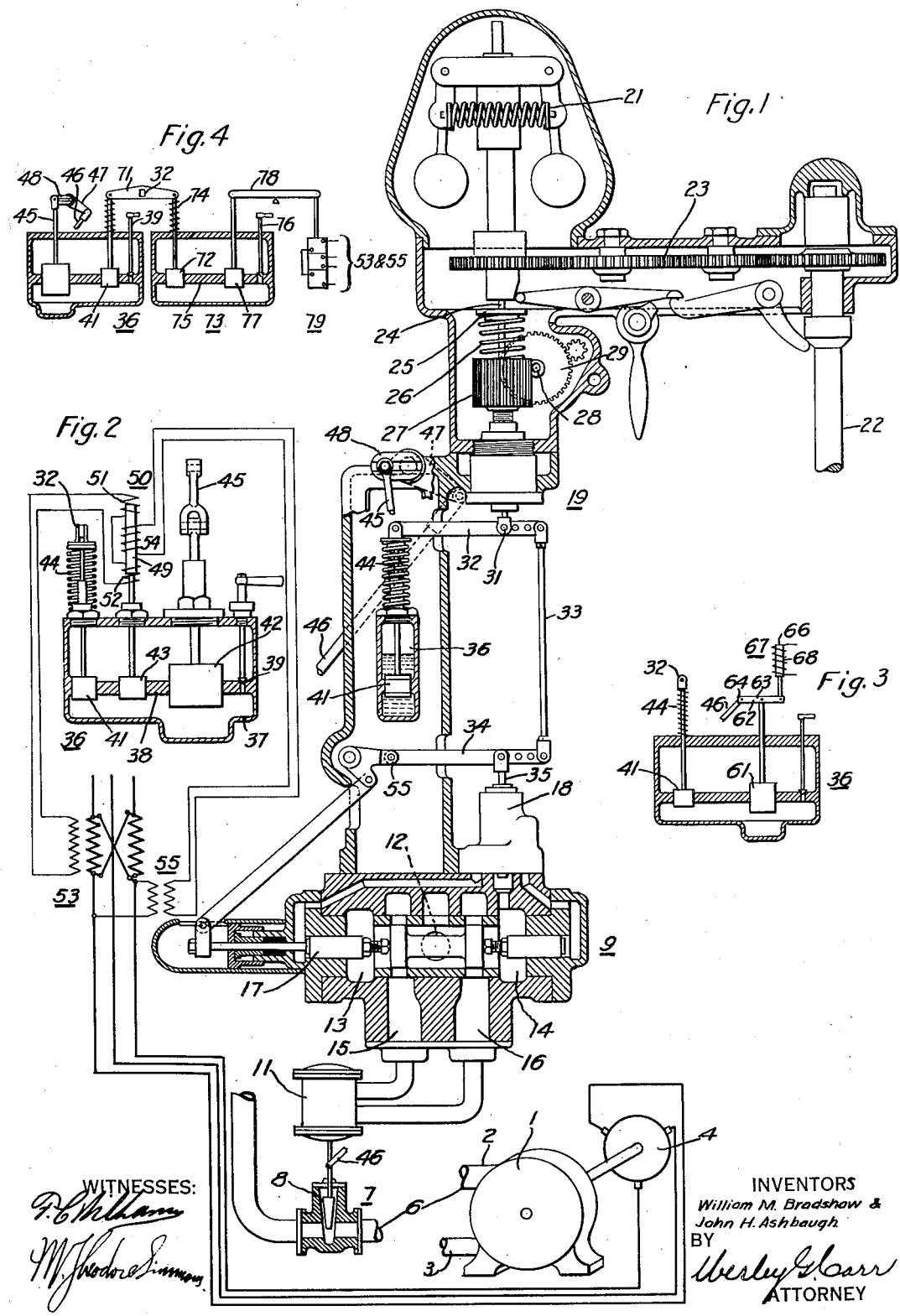
INVENTORS
William M. Bradshaw &
John H. Ashbaugh
BY
Wesley G. Carr
ATTORNEY Patented May 11, 1926.

1,584,602

UNITED STATES PATENT OFFICE.

WILLIAM M. BRADSHAW AND JOHN H. ASHBAUGH, OF WILKINSBURG, PENNSYLVANIA, ASSIGNORS TO WESTINGHOUSE ELECTRIC AND MANUFACTURING COMPANY, A CORPORATION OF PENNSYLVANIA.

REGULATOR SYSTEM.

Application filed December 7, 1921. Serial No. 520,593.

Our invention relates to speed-regulator systems and, more specifically, to a regulator system for governing the speed of waterwheels driving dynamo-electric machines.

One object of our invention is to combine with a prime mover using a standard form of governor mechanism, such as a speed governor, additional means adapted to anticipate in said governor mechanism the load changes upon the dynamo-electric machine that is connected to the prime mover.

In controlling a prime mover that is connected to an electric generator, for example, it is desirable to maintain the speed of the prime mover substantially constant, thereby maintaining constant conditions upon the supply circuit that is connected to said generator. A prime mover that is equipped with a speed governor, such as a centrifugal flyball governor, requires an actual change in speed before a corrective movement is initiated. If the change is speed is due to an increase or a decrease in the load upon the generator that is driven by the prime mover, it will be apparent that the change in load must exist for a considerable period of time before the speed of the prime mover is affected. This statement is particularly true where the prime mover is a water-wheel or a steam turbine. After the speed change is indicated upon the governor mechanism, a certain procedure must be followed before the speed is corrected to meet the new load condition upon the generator.

It is the object of the present invention to provide governor mechanism with an auxiliary regulating means that is adapted to effect the operation of the governor mechanism in accordance with load variations upon the generator prior to a change in speed of the water-wheel or other prime mover. Thus, a load variation will be compensated for prior to the normal action of the water-wheel and associated governor mechanism, independently operating under such load change.

The present invention contemplates providing the anti-hunting mechanism or compensating dash-pot of a water-wheel governor with an auxiliary piston which is adapted to be controlled by a watt electromagnet.

In the accompanying drawings,

Figure 1 is a diagrammatic illustration of a water-wheel driven generator system, the water-wheel governor being shown partly in section;

Fig. 2 is a detail view of the compensating dash-pot of the governor mechanism, equipped in accordance with the present invention;

Fig. 3 is a detail view of a modified form of the compensating dash-pot also, illustrating the use of a current-controlled piston, and Fig. 4 is a detail view of another modification of the present invention.

Referring to Fig. 1, a water-wheel 1, having an inlet 2 and an outlet 3, has, directly connected thereto, a generator 4. Connected to the inlet 2 of the water-wheel in the usual way, is a penstock 6. A hydraulically-operated valve 7 is provided with a gate 8 and is interposed in the penstock to govern the supply water for the water-wheel. The valve 7 is adapted to be operated through the movement of a main valve 9 and a relay valve 11. The main valve 9 is provided with a supply opening 12 and discharge openings 13 and 14. The main valve 9 is also provided with two openings 15 and 16 which lead to the relay valve 11. The main valve 9 is provided with a piston 17 which controls the operation of the relay valve 11 and, in turn, the operation of the gate valve 7. Main valve 9 is controlled by means of a pilot valve 18 and the governor mechanism, indicated generally at 19.

It is believed unnecessary to describe in detail the construction and operation of the various valves, since such operation is well known. It will suffice to say that the main valve 9 is operated to admit fluid to opening 16 for operation of the relay valve 11 to raise the gate 8, and fluid is admitted to the opening 15 to effect operation of the relay valve 11 to lower the gate 8. By raising or lowering the gate 8, more or less water is admitted to the water-wheel 1 to increase or decrease its speed, in accordance with the usual practice.

Any well-known form of governor mechanism may be used to control the operation of the water-wheel, the illustrated form being for purposes of description only. Briefly, the governor mechanism comprises a centrifugal device 21 that is operated in accordance with the speed of the water-wheel, as transmitted from the water-wheel through shaft 22 and gearing 23 to the device, 21, in accordance with a familiar practice.

Movements of the centrifugal device are communicated to a rod 24 having a collar 25 secured thereto. Bearing against the collar 25 is one end of a coiled spring 26, the other end of which fits within a hollow worm gear-wheel 27. Gear-wheel 27 is adjusted through the operation of a worm 28 and associated gearing 29, either by hand operation or motor operation. Adjustments of the gear-wheel 27 increase or decrease the tension of the spring 26 and thereby regulate the setting of the governor mechanism. Rod 24 is pivoted at 31 to a floating lever 32 also having pivotally connected to one end thereof a link 33. Link 33 is also pivotally connected to a second floating lever 34. Floating lever 34 is directly connected to stem 35 of pilot valve 18.

Variations in the operation of the centrifugal device 21, which are produced by variations in speed of the water-wheel 1, are communicated to the floating-lever system and to the valves 18 and 9, to control the speed of the water-wheel, as heretofore explained.

After a corrective movement is begun, it is desirable to stop the operation of the governor mechanism, prior to the obtaining of normal speed by the water-wheel, to prevent hunting action thereby. In the illustrated form of governor, this anti-hunting mechanism comprises a dash-pot or cylinder 36 and associated mechanism. The dash-pot 36 is best illustrated in Fig. 2 and comprises a casing 37 divided by a partition 38. Located in the partition 38 is a needle valve 39 and a plurality of ports, within which are respectively located pistons 41, 42 and 43.

The cylinder 36 is operatively connected to the floating-lever system of the governor mechanism by means of the piston 41, which is pivotally connected, at its upper end, to the free end of the floating lever 32. The piston 41 is normally maintained in its central closing position by means of a centering spring 44.

In order to obtain the desired anti-hunting action, the dash-pot 36 is equipped with the piston 42, the stem of which is pivotally connected to a crank arm 45. The crank arm 45 is actuated by means of levers 46 and 47 and compensating crank 48, as illustrated in Fig. 1. The lever 46 is connected to the gate mechanism 8 to impart a reactionary movement to the piston 42 and to the governor mechanism proportional to the opening or the closing of the gate mechanism in the corrective movement. If the piston 42 is moved suddenly, the oil in the dash-pot will be compressed faster than it can escape through the valve 39, and hence, the piston 41 will be moved. This movement will be communicated to the floating lever 32 which will be moved about the pivot 31 to reset the governor mechanism and co-operating valves. Since this method of compensation and the connections are well known, it has not been deemed necessary to complicate the drawings herein by illustrating the same in detail.

The foregoing description has been that of the normal operation of the governor mechanism for maintaing the speed of the associated water-wheel or other prime mover substantially constant.

In order to control the operation of the water-wheel in accordance with changes in load upon the generator that is connected thereto and to compensate for such load changes prior to the normal operation of the governor mechanism, independently operating under such load changes, the dash-pot 36 is provided with the previously-mentioned piston 43. Connected to the stem of the piston 43 is the core armature 49 of an electromagnet 50, which is energized in accordance with the load upon the generator 4. The electromagnet 50 comprises oppositely-disposed differential coils 51 and 52, which are energized from series transformers 53, located in the supply circuit that is connected to the generator 4. Centrally disposed upon the core armature 49 is a coil 54, which is energized from shunt transformer 55, also located in the supply circuit that is connected to the generator 4. Consequently, the electromagnet receives the load indication in accordance with the watts of the supply circuit.

Upon an increase in load, the magnet 49 receives an increased energization, which actuates it downwardly, thereby displacing the piston 43 downwardly. If the load change is small or gradual, the movement of the piston 43 will be correspondingly slow, and the compressed oil will escape through the needle valve 39. However, if the load change is sudden or large, a relatively quick or large movement is imparted to the piston 43. Since the compressed oil can not entirely escape through the needle valve 39, the piston 41 will be moved upwardly. This movement will actuate the floating lever 32 about the pivot 31 to depress the link 33 and floating lever 34, about the pivot 55, thereby actuating the pilot valve 18 and the main valve 9 to admit fluid to the relay valve 11 to open the gate 8. More water will then be admitted to the water-wheel to maintain its speed substantially constant, thereby enabling the generator 4 to assume the new load demand. By means of the electrical connections illustrated, the load change upon the generator 4 is communicated to the electromagnet 50 as soon as it occurs upon the supply circuit and, hence, the governor mechanism is actuated as above described to compensate for this load change before an actual change occurs in the speed of the water-wheel 1. Furthermore, the watt electromagnet effects only a temporary control of the governor mechanism.

In the event of a decrease in load upon the generator 4 and its associated supply circuit, the opposite action of the load operated piston will be effected to close the gate 8 and decrease the water that is supplied to the water-wheel 1.

In Fig. 3 is illustrated a modification of the compensating dash-pot 36 and regulator means. Wherever the dash-pots of Figs. 2 and 3 are similar in structural details, the duplicated parts are given the same reference numerals. Moreover, the modes of operation are similar, the piston 41 being directly connected to one end of the floating lever 32. However, in place of independent pistons operated respectively in accordance with the reaction from the gate movement and the dynamo-load variations, the dash-pot of Fig. 3 is equipped with but one piston 61, which is pivotally connected to a floating lever 62, as indicated at 63.

The lever 46 of Fig. 1, which is directly connected to the gate mechanism to receive a reactionary movement therefrom proportional to the gate operation, is pivotally connected to one end of the floating level 62, as indicated at 64. A core armature 66 of an electromagnet 67, is pivotally connected to the opposite end of the floating lever 62, as indicated at 65. The electromagnet 67 is adapted to be actuated in accordance with variations in load upon the supply circuit of the generator 4.

Since, on certain constant-voltage supply lines, the current is an indication of the load, the magnet 67 of Fig. 3 is illustrated as energized by a current winding 68, which may be connected to the series transformers 53. With such a connection, an increase in load upon the supply circuit of the generator 4 would actuate the core armature 66 downwardly, thereby depressing the lever 62 about the pivot 64 to displace the piston 61 within the dash-pot 36. As described with reference to Fig. 2, this movement will actuate the piston 41 to effect operation of the governor mechanism to correct for the increase in load. The reactionary movement proportional to the gate movement is communicated through the lever 46 to the floating lever 67, which is moved about the pivot 65 to operate the piston 61 and cause a resetting of the governor mechanism, as above described.

In Fig. 4 is illustrated another modification of the present invention. In this figure, the dash-pot 36 of the governor mechanism 19 comprises the air-vent 39, piston 41, which is connected to the floating-lever system of the governor mechanism, and piston 42, which is adapted to receive a reactionary movement proportional to the gate movement, as heretofore described. In the standard governor, wherein the present invention is not applied, the piston 41 is connected directly to the floating lever 32. In the modification illustrated in Fig. 4, the piston 41 is pivotally connected to one end of a floating lever 71, which, in turn, is pivoted upon the floating lever 32. The opposite end of the lever 71 has pivotally connected thereto a piston 72 which is mounted within an auxiliary dash-pot 73, similar in construction to dash-pot 36. Piston 72 has co-operating therewith a centering spring 74. The dash-pot 73 is divided by a partition 75 and is provided with a needle valve 76. Also co-operating with the dash-pot 73 is a second piston 77, which is pivotally mounted upon one end of a lever 78, having connected to the other end thereof an electromagnet 79. The electromagnet 79 is similar in all respects to electromagnet 50 of Fig. 2 and, as indicated in that figure, may be connected to the transformers 53 and 55 to be energized in accordance with the watts of the supply circuit that is connected to the dynamo-electric machine 4, which is driven by the water-wheel 1.

The operation of the system of Fig. 4 is similar, in principle, to the systems heretofore described; namely, in the event of a load change upon the supply circuit of the dynamo-electric machine, the watt-magnet 79 will be moved to actuate the piston 77. This action will, in turn, effect movement of the piston 72 and the lever 71 about the pivot of the connection to the piston 41. The movement of the lever 71 will actuate the floating lever 32 of the governor mechanism to set in action the train of mechanism to open or close the water-wheel gate mechanism 8 in anticipation of the normal operation of the governor mechanism. A reactionary movement, such as has been heretofore described with reference to Figs. 1 and 2, will be imparted to the piston 42, thereby moving the piston 41 and the lever 71 about the pivotal point of connection to the piston 72. The movement of the lever 71 will again actuate the floating lever 32 of the governor mechanism to reset the same.

Other modifications in the system and arrangement and location of parts may be made without departing from the spirit and scope of my invention. I desire, therefore, to be limited only by the scope of the appended claims.

We claim as our invention:

1. The combination with a water-wheel, a penstock co-operating therewith, a gate valve located in said penstock, main and pilot valves adapted to actuate said gate valve, governor mechanism co-operating with said valves to control the operation of said water-wheel, said governor mechanism comprising a centrifugal device actuated in accordance with the speed of the water-wheel, floating levers connecting said pilot valve and said centrifugal device, and a compensating dash-pot having a piston connected directly to one of said levers, and a second piston actuated in accordance with the reaction of the mechanism corrective movement and a generator driven by said water-wheel, of regulating means co-operating with said governor mechanism and adapted to actuate said governor mechanism in accordance with variations in load upon said generator.

2. The combination with a water-wheel, a penstock co-operating therewith, a gate valve located in said penstock, means adapted to actuate said gate valve, said mechanism comprising a centrifugal device actuated by said water-wheel, floating levers between said valve and said mechnism, and a dash-pot having a piston connected to one of said levers, and a second piston actuated in accordance with the reaction of the gate valve corrective movement, and a generator driven by said water-wheel, of means co-operating with said dash-pot and adapted to actuate said governor mechanism in accordance with variations in load upon said generator.

3. The combination with a water-wheel, means adapted to control the operation of said water-wheel comprising governor mechanism having a dash-pot associated therewith, means co-operating with said dash-pot having a reaction proportional to the corrective movement of said system, and a generator driven by said water-wheel, of means adapted to actuate said governor mechanism in accordance with variations in load upon said generator.

4. The combination with a water-wheel, a generator connected thereto, governor mechanism for said water-wheel comprising means actuated in accordance with the speed of the water-wheel, a floating lever system, and anti-hunting means co-operating with said floating lever system, of means cooperating with said anti-hunting means and adapted to actuate said governor mechanism in accordance with variations in load upon said generator.

5. The combination with a water-wheel and a generator connected thereto, of governor mechanism for said water-wheel comprising means actuated in accordance with the speed of the water-wheel, a floating lever system and anti-hunting means comprising a dash-pot having a piston connected directly to said system, a second piston having a reactionary movement proportional to the mechanism-corrective movement, and a third piston actuated in accordance with variations in load upon said generator.

6. The combination with a water-wheel, and a generator connected thereto, of normally operating governor mechanism for said water-wheel having anti-hunting means co-operating therewith comprising a dash-pot having co-operating therewith a piston actuated in accordance with variations in load upon said generator and adapted to also actuate said governor mechanism.

7. The combination with a prime mover and a dynamo-electric machine connected thereto, of governor mechanism comprising a dash-pot, a mechanically actuated piston therein and an electromagnetically actuated piston cooperating therewith for controlling the operation of said prime mover.

8. The combination with a prime mover and a dynamo-electric machine connected thereto, of governor mechanism for said prime mover comprising means actuated in accordance with the speed of the prime mover, and a compensating dash-pot for said governor mechanism having a piston therein actuated in accordance with variations in load upon said dynamo-electric machine to also actuate said governor mechanism.

9. The combination with a prime mover, a dynamo-electric machine connected thereto, governor mechanism for said prime mover comprising means actuated in accordance with the speed of said prime mover, a floating lever system, and a dash-pot co-operating with said mechanism, of means co-operating with said governor mechanism comprising an auxiliary piston located in said dash-pot and adapted to actuate said governor mechanism in accordance with variations in load upon said dynamo-electric machine.

10. The combination with a prime mover, and a dynamo-electric machine connected thereto, of means adapted to control the operation of said prime mover comprising speed-actuated mechanism, a dash-pot, and means co-operating with said speed mechanism and actuated in accordance with variations in load upon said dynamo-electric machine, said means comprising an auxiliary piston for said dash-pot, and an electro-magnet for controlling said piston.

11. The combination with a water-wheel, a generator connected thereto, normally acting governor mechanism adapted to control the operation of said water-wheel and anti-hunting mechanism for said governor comprising a cylinder, of means co-operating with said cylinder to effect operation of the governor mechanism, and an electromagnet energized in accordance with the load upon said generator for controlling said means.

12. The combination with a water-wheel, a generator connected thereto, normally acting governor mechanism adapted to control the speed of said water-wheel, and a cylinder operatively associated with said mechanism, of means co-operating with said cylinder to effect operation of said mechanism, said means being responsive to variations in load upon said generator and adapted to anticipate such load changes in the operation of the governor mechanism.

13. The combination with a prime mover, a dynamo-electric machine connected thereto, a supply circuit and normally acting governor mechanism adapted to control the operation of said prime mover and having a cylinder operatively associated with said mechanism, of means adapted to effect operation of said mechanism in accordance with variations in load upon said dynamo-electric machine and comprising an electromagnet energized in accordance with the watts of the supply circuit connected to said dynamo-electric machine.

14. In a regulator system, the combination with a prime mover, a dynamo-electric machine connected thereto, normally-operating governor mechanism adapted to control the speed of operation of said prime mover, and anti-hunting means associated with said mechanism comprising a dash-pot and a plurality of pistons, one of which is operatively connected to said governor mechanism, of a floating lever connected to another of said pistons, means pivotally connected to said floating lever receiving a reactionary movement proportional to the corrective movement of said mechanism, and electromagnetic means also pivotally connected to said floating lever and energized in accordance with variations in load upon said dynamo-electric machine, whereby said second-mentioned piston is actuated to prevent hunting action by said mechanism and is also actuated in accordance with variations in load upon said dynamo-electric machine to cause said governor mechanism to control said prime mover.

15. In a regulator system, the combination with a prime mover, a dynamo-electric machine connected thereto, and normally-operating governor mechanism adapted to control the speed of operation of said prime mover and having a dash-pot and a plurality of pistons associated therewith, one of which is operatively connected to said governor mechanism, of a floating lever connected to another of said pistons, means pivotally connected to said floating lever to actuate said piston to prevent hunting action by said mechanism, and electro-magnetic means also pivotally connected to said floating lever and adapted to temporarily actuate the associated piston in accordance with variations in load upon said dynamo-electric machine to govern said prime mover.

16. The combination with a prime mover and a dynamo-electric machine connected thereto, of governor mechanism normally operating to control the speed of said prime mover and having a cylinder and two pistons co-operating therewith, of means for controlling one of said pistons proportional to the corrective movement of said mechanism, and means for also controlling the other of said pistons in accordance with variations in load upon said dynamo-electric machine.

17. The combination with a prime mover a dynamo-electric machine connected thereto, and normally-operating governor mechanism adapted to control the speed of operation of said prime mover and having a cylinder, a plurality of pistons and a floating lever system co-operating therewith, of means operating through said pistons and floating lever system for controlling said mechanism proportional to the corrective movement thereof, and means also operating through said floating lever system and pistons for controlling said mechanism in accordance with variations in load upon said dynamo-electric machine.

18. The combination with a water-wheel and a generator connected thereto, of normally-operating governor mechanism for said water-wheel having anti-hunting means co-operating therewith comprising a dash-pot having co-operating therewith a piston actuated in accordance with variations in load upon said generator and adapted to temporarily actuate said governor mechanism.

19. In a regulator system, the combination with a prime mover, a dynamo-electric machine connected thereto, and normally-operating governor mechanism adapted to control the speed of operation of said prime mover and having a dash-pot and a plurality of pistons associated therewith, one of which is operatively connected to said governor mechanism, of a floating lever connected to another of said pistons, means pivotally connected to said floating lever to actuate said piston to prevent hunting action by said mechanism, and electromagnetic means also pivotally connected to said floating lever and adapted to temporarily actuate the associated piston in accordance with variations in load upon said dynamo-electric machine to govern said prime mover.

In testimony whereof, we have hereunto subscribed our names this 3rd day of December, 1921.

WILLIAM M. BRADSHAW.
JOHN H. ASHBAUGH.